United States Patent [19]
Chambers et al.

[11] Patent Number: 5,854,982
[45] Date of Patent: Dec. 29, 1998

[54] COMMUNICATION SYSTEM ARCHITECTURE AND METHOD OF ROUTING THEREFOR

[75] Inventors: David Chambers, Winchester, United Kingdom; Kenneth A. Gustafson, Schaumburg, Ill.; Paul Crichton, Newbury, United Kingdom; Karen E. Hathaway-Norman, Palatine, Ill.; Sue Ellen Schroeder, Streamwood, Ill.; Dennis E. Vogt, South Elgin, Ill.

[73] Assignee: Motorola, Inc., Schaumburg, Ill.

[21] Appl. No.: 517,515

[22] Filed: Aug. 21, 1995

[51] Int. Cl.$^6$ .............................. H04Q 7/20; H04Q 7/22; H04Q 7/24
[52] U.S. Cl. .......................... 455/445; 455/433; 455/432
[58] Field of Search ................................. 379/57, 58, 59, 379/60; 455/33.1, 33.2, 432, 433, 435, 439, 436, 445, 438, 434

[56] References Cited

U.S. PATENT DOCUMENTS

| | | | |
|---|---|---|---|
| 5,479,481 | 12/1995 | Koivunen | 379/59 |
| 5,537,457 | 7/1996 | Lantto et al. | 379/58 |
| 5,537,594 | 7/1996 | Shannon et al. | 379/58 |
| 5,596,624 | 1/1997 | Armbruster et al. | 455/435 |

FOREIGN PATENT DOCUMENTS

| | | | |
|---|---|---|---|
| 0467534A2 | 1/1992 | European Pat. Off. | |
| 481714-A | 4/1992 | European Pat. Off. | 379/59 |
| WO 94/23506 | 3/1994 | WIPO | |
| WO96/11557 | 4/1996 | WIPO | |

OTHER PUBLICATIONS

Seshadri Mohan and Ravi Jain, "Two User Location Strategies for Personal Communications Services", IEEE Personal Communication 1st Quarter, No. 1, New York, New York, pp. 42–50.

*Primary Examiner*—Wellington Chin
*Assistant Examiner*—Keith Ferguson
*Attorney, Agent, or Firm*—Richard A. Sonnentag

[57] ABSTRACT

To alleviate the constraints imposed on communication system management by the assignment of dedicated ranges of MSISDNs and IMSIs to each particular home location register ($HLR_1$, $HLR_2$, $HLR_N$), the present invention provides an ability to separate IMSIs and MSISDNs between HLR platforms by providing at least two databases (80–90) separated from one another and indexed in terms of ranges of MSISDNs and ranges of IMSIs, as illustrated in FIG. 5. A cross-reference (92, 95) is both stored within a particular MSISDN and a particular IMSI to maintain an association therebetween, thereby allowing access to subscription information stored in at least one of the particular MSISDN and the particular IMSI.

20 Claims, 3 Drawing Sheets

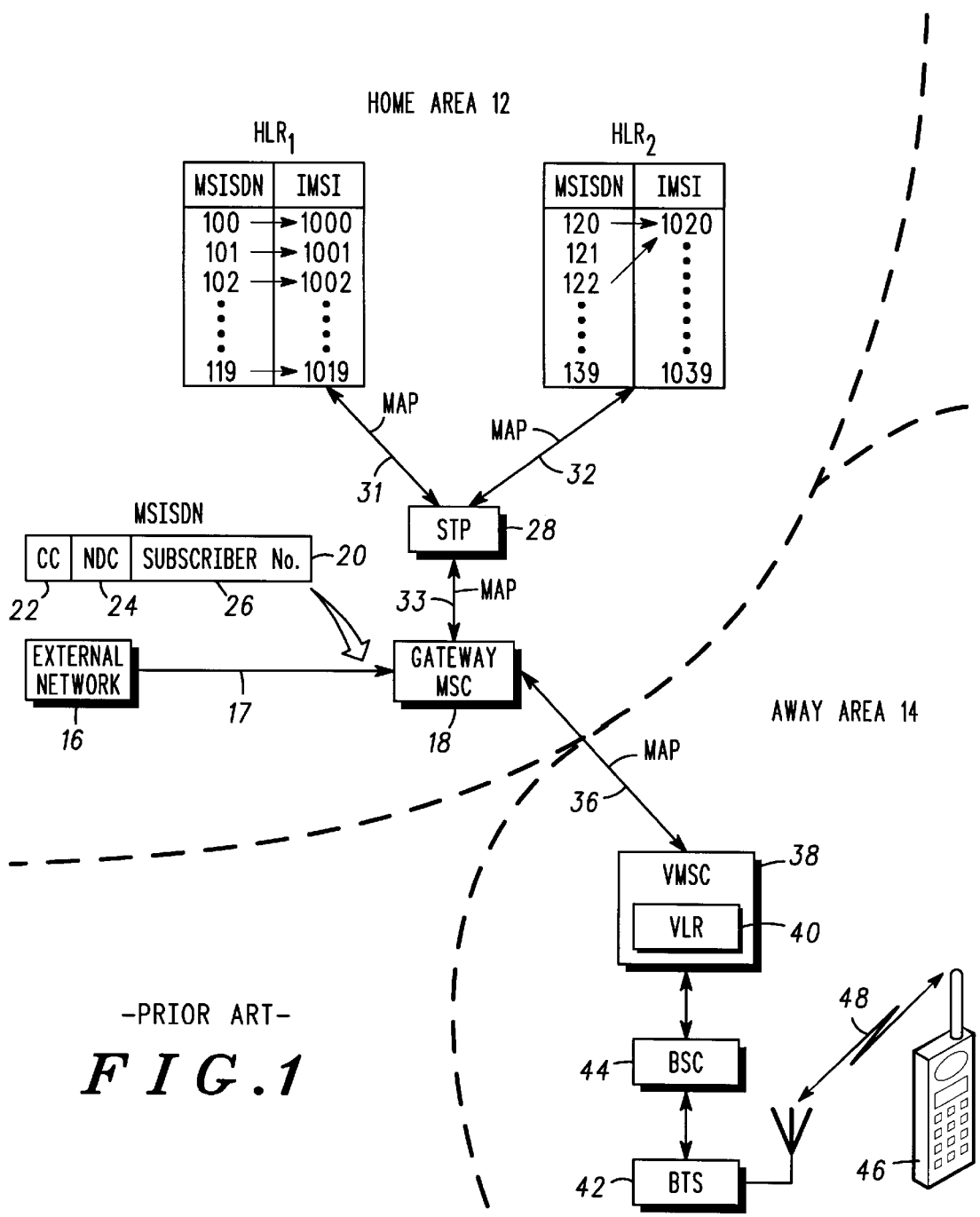
*FIG.1*
-PRIOR ART-
*FIG.2*
-PRIOR ART-
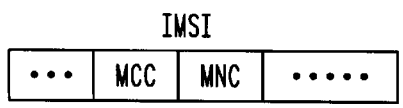

1

COMMUNICATION SYSTEM ARCHITECTURE AND METHOD OF ROUTING THEREFOR

FIELD OF THE INVENTION

This invention relates, in general, to a communication system (and architecture thereof) and is particularly, but not exclusively, applicable to the management of the association of International Mobile Subscriber Identities (IMSIs) and Mobile Subscriber Integrated Service Digital Network (MSISDN) numbers for a cellular communication system architecture.

BACKGROUND OF THE INVENTION

In a cellular communication system, such as the pan-European Groupe Speciale Mobile (GSM) communication system, subscription information (as well as location information) pertaining to a roaming mobile subscriber unit is stored (and up-dated periodically) in a home location register (HLR). As such, a HLR (of which there are many in the communication system) provides the key by which mobile terminated calls are rooted to a relevant roaming mobile subscriber unit.

To appreciate how a cellular system operates and particularly how subscription information relating to a multitude of mobile subscriber units is stored and accessed within a HLR, one must understand the nature and technique for assigning subscriber directory numbers (i.e. a telephone number) to mobile subscriber units. Every HLR in the communication system has a dedicated range of Mobile Subscriber Integrated Service Digital Network (MSISDN) numbers and a dedicated range of International Mobile Subscriber Identities (IMSI). The MSISDN represents the subscriber directory number, which directory number is assigned by a network operator to a particular subscription affiliated with the network operator, whereas each IMSI in a HLR stores subscription information relating to a subscriber (including the directory number).

At the time when the subscriber directory number is assigned by the network operator, an IMSI is directly associated (mapped) with the MSISDN. As such, it is the IMSI that is the key to operation of a cellular communication system. Furthermore, as will be appreciated, no two HLRs have the same ranges of MSISDNs and IMSIs, and more than one MSISDN may be associated with (mapped on to) a single IMSI. Therefore, since mappings of MSISDNs to IMSIs are fixed within a HLR, the communication system is extremely inflexible and does not lend itself to manipulation of IMSIs and MSISDNs once they have been assigned to a particular subscriber unit.

Although the following description refers specifically to a GSM cellular communication system, it will be appreciated that the problems inherent therein may also be prevalent in communication systems, generally, that require the association of a subscriber directory number (or subscriber identity number) with an IMSI. In the GSM cellular communication system, a Smart-Card (usually termed a "SIM" card) containing an indication of the assigned IMSI is provided to a user of a subscriber unit. By providing the IMSI to a user in this fashion, a user may insert the SIM card into any one of a number of subscriber units. It is only after the insertion of the SIM card that the subscriber unit becomes fully operational and thereby allows access to at least some of the services provided by a particular network operator. Unfortunately, in the event that a SIM card is broken or stolen, a replacement SIM card must be issued by the network operator to the user with a new IMSI. Moreover, as a consequence of losing the original SIM card (which provides access to subscription data stored in an IMSI), it is necessary for the network operator to terminate access to the original IMSI. Now, because the replacement IMSI may fall within the range of a new HLR, the original MSISDN can no longer be used because it is associated with the range of the original HLR. Thus, the routing of call is no linger possible because subscription information (and thus location information) is held in the new HLR whereas the routing inquiry is directed towards the original HLR. Considering the problem in an alternate vein, routing of a call to a HLR is based upon the fixed association between the MSISDN and IMSI ranges of the HLRs, and as such it may not be possible to assign the original MSISDN (subscriber directory number) to the user because there are no further IMSIs available in the HLR for association with the original MSISDN. That is to say, assignment of an original subscriber directory number is not possible because the original subscriber directory number can no longer be associated with an IMSI from the dedicated range of IMSI values available in the HLR of the MSISDN. Therefore, a user is forced to change a subscriber directory number (MSISDN) in order to compensate for the inflexibility of the system that arises from a different HLR having different dedicated (or specified) ranges of MSISDNs and associated IMSIs, Clearly, this is undesirable since the new subscriber directory number (MSISDN) must be disseminated appropriately.

In a communication system, it is desirable to be able to provide, when requested, special directory numbers. More particularly, such special directory numbers may be required by a user who is unable to remember an obscure MSISDN previously assigned to him by the network operator, or where the user wishes to have a special directory number that is both easily associated with him or is easily remembered by a customer of the user. However, if a subscriber requests a particular MSISDN, then this particular MSISDN must be within the fixed MSISDN ranges of the HLRs provided to the network operator. As such, a network operator may be unable to provide a subscriber-requested (special) directory number, such as 12345 or 8888, because such a special MSISDN may be out-of-range in terms of the MSISDNs available in HLRs (or parts thereof) supporting the IMSI allocated to the subscriber (bearing in mind that all IMSIs may already be allocated on the HLR supporting the desired MSISDN range).

Basically, present-day communication systems suffer from an "out-of-range" problem since the ranges of IMSI and MSISDN for each HLR are set in the network and it is therefore difficult to apply IMSI values outside the range of MSISDN values (and vice versa). In fact, there is no convenient mechanism within any communication system to handle such out-of-range associations.

Additionally, the management of subscriber units dictates that it is easier to assemble particular groups of subscriber units in one HLR. For example, all subscriber units originating from, for example, the Manchester geographic area could be assembled within a first range of MSISDNs (or IMSIs) and hence potentially located in consecutive memory locations of one or more HLRs. Having to re-assign new IMSIs is therefore undesirable because this would distribute a group of users across numerous HLRs belonging to a network operator. Additionally, of particular concern to the network operator is the loss of an IMSI because the loss of an IMSI will restrict the number of subscribers that a network operator can service (as a whole or through a particular HLR).

Therefore, losing an IMSI (i.e. a memory location in which subscriber information is stored) reduces the capacity of the network. Clearly, both these considerations affect the profitability of the network operator as a result of increased management overhead and decreased capacity. More importantly, it is highly undesirable from a system configuration view-point to require sub-sets of a HLR's MSISDN range to be transferred (moved or associated) to another HLR, since this transfer would result in substantial increase in the complexity of Gateway routing.

It will therefore be appreciated that there is a requirement in the art to provide the communication system with a structural architecture that provides greater flexibility in terms of MSISDN and IMSI management.

SUMMARY OF THE INVENTION

According to a first aspect of the present invention there is provided a communication system having a range of MSISDNs and a range of IMSIs assigned thereto for storing subscription information, the communication system comprising at least two databases separated from one another and indexed in terms of said ranges of MSISDNs and said ranges of IMSIs, wherein a cross-reference is both stored within a particular MSISDN and a particular IMSI to maintain an association therebetween, thereby allowing access to subscription information stored in at least one of the particular MSISDN and the particular IMSI.

In a preferred embodiment, the system further comprises a plurality of home location registers each having a unique range of MSISDN addresses and IMSI addresses assigned thereto, each home location register of the plurality of home location registers comprising: memory partitioned into a MSISDN-keyed database and an IMSI-keyed database, the MSISDN-keyed database and the IMSI-keyed database each comprising memory blocks, for storing the subscription information, identified by one of a MSISDN address and an IMSI address assigned respectively thereto, wherein a MSISDN address of a first home location register of the plurality of home location registers is associated with an IMSI address of a second home location register of the plurality of home location registers and each memory block of each database contains the cross-reference for the association, thereby allowing cross-system access to similarly partitioned home location registers.

In an alternate embodiment, the communication system routes a call from an external network to a subscriber unit having a directory number (MSISDN) identified in the call. In this alternate embodiment, the communication system comprises: a HLR router, coupled to the external communication network, having a range of directory numbers and a range of intermediate addresses, wherein at least some of the directory numbers of the range of directory numbers are mapped to one intermediate address (RN-MSISDN) to convert a received directory number to an intermediate address; a plurality of home location registers, each coupled to the HLR router and each having a range of intermediate addresses and a range of IMSIs, wherein each IMSI is arranged to store information pertaining to a subscriber unit and no two HLRs have the same ranges of intermediate addresses and IMSIs; and a processing unit for controlling the routing of the intermediate address to a home location register in which the intermediate address resides, such that information relevant to the directory number that originated from the external network is recovered from a mapping, in the HLR, of the intermediate address with an IMSI associated therewith; whereby the communication system allows separation, across a plurality of HLRs, of a MSISDN from an IMSI of a subscriber unit that is related to the MSISDN.

In a second aspect of the present invention there is provided a home location register for a cellular communication system having a range of MSISDNs and a range of IMSIs assigned thereto, the home location register comprising at least two databases separated from one another and indexed in terms of a specific proportion of the range of MSISDNs and a specific proportion of the range of IMSIs, wherein a cross-reference is both stored within a particular MSISDN and a particular IMSI to maintain an association therebetween and such that the cross-reference may identify one of the particular MSISDN and the particular IMSI as falling outside the proportion of the range of each respective database, thereby allowing access to subscription information stored in at least one of the particular MSISDN and the particular IMSI.

In a further aspect of the present invention there is provided a routing terminal, arranged to receive a directory number (MSISDN) originating from an external network, for routing a call to a subscriber unit having that directory number, the routing terminal arranged to be coupled to at least one home location register (HLR) of a communication system, the routing terminal comprising: a range of directory numbers (MSISDNs) and a range of intermediate addresses (RN-MSISDNs), each intermediate address (RN-MSISDN) associated with at least one directory number to convert a received directory number to an intermediate address; wherein the routing terminal is responsive to a processing unit that directs the intermediate address to a HLR having that intermediate address contained within a range of intermediate addresses, the HLR further comprising a range of IMSIs for storing information, wherein each IMSI in the range of IMSIs is responsive to at least one intermediate address of the range of intermediate addresses such that information relevant to the directory number that originated from the external network is recovered from a mapping of the intermediate address with an IMSI associated therewith.

In yet another aspect of the present invention there is provided a method of routing a call from an external network to a subscriber unit of a communication system coupled to the external network, the subscriber unit having a directory number (MSISDN) identified in the call, the method comprising the steps of: receiving the directory number from the external network; converting the directory number to an intermediate address (RN-MSISDN) associated with the directory number; intelligently routing the intermediate address (RN-MSISDN) to a home location register (HLR) containing the intermediate address; and accessing the intermediate address in the HLR to recover information relevant to the call.

An exemplary embodiment of the present invention will now be described with reference to the accompanying drawings.

BRIEF DESCRIPTION OF THE DRAWINGS

FIG. 1 is a prior art representation of a communication system, such as a cellular communication system.

FIG. 2 shows an exemplary structure of a prior art memory location for an IMSI of the communication system of FIG. 1.

DETAILED DESCRIPTION OF A PREFERRED EMBODIMENT

Figure 3:
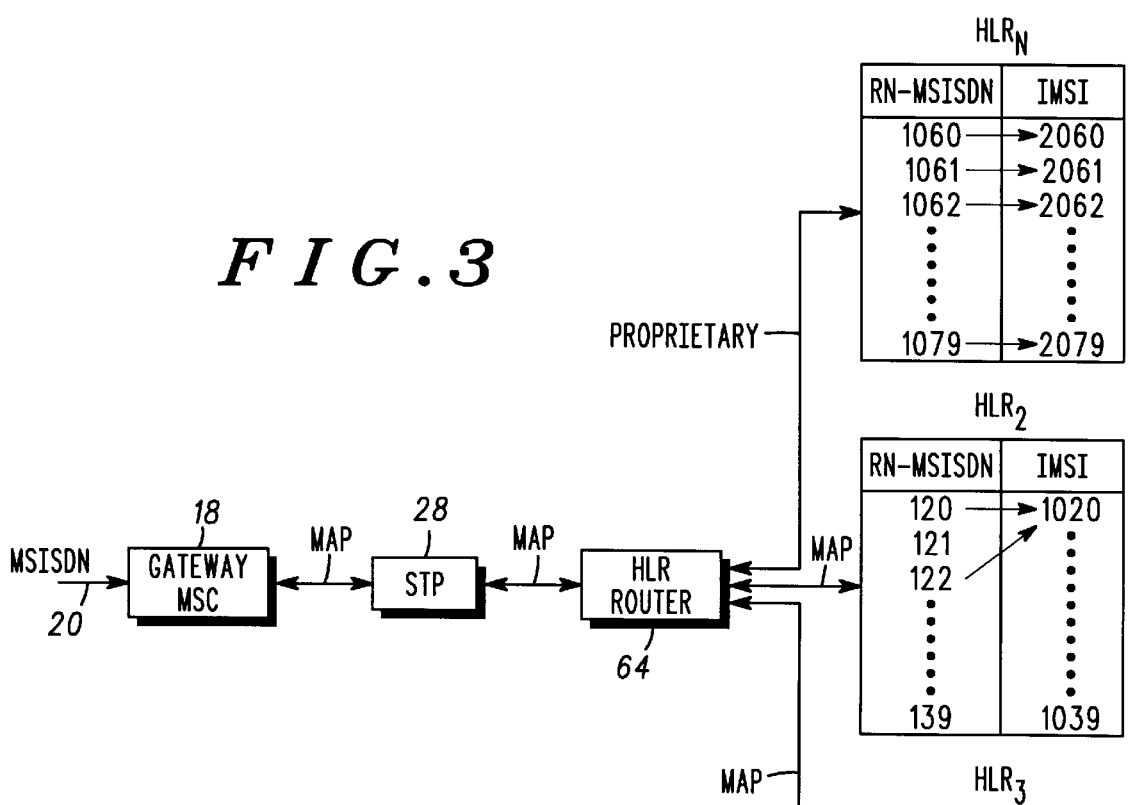
FIG. 3 illustrates an architecture for a communication system according to a preferred embodiment of the present invention.

Referring to FIG. 1, there is shown a prior art architecture for a communications system 10, such as a cellular communication system. The communication system 10 is partitioned into a plurality of geographic service areas. For the purposes for illustration, only two such geographic service areas are shown; Home Area 12 and Away Area 14. An external network 16, such as a landline telephone network, is coupled through a communication link 17 to a Gateway Mobile Switching Centre (MSC) 18 of the cellular communication system 10. The Gateway MSC 18 is arranged to direct mobile terminated calls to a relevant home location register (HLR) based upon reception of a MSISDN 20 received from the external network 16. As can be seen, the MSISDN 20 comprises three portions. A first portion 22 of the MSISDN 20 represents an international Country Code (CC), such as 44 for the UK. The second portion 24 of the MSISDN 20 is a number that represents a Network Destination Code (NDC) and is analogous to an area code in a telephone system. A third portion 26 of the MSISDN 20 is used, principally, for a subscriber directory number (comprising a plurality of digits), although there may be additional information slots available in this portion. Together, the first portion 22, the second portion 24 (i.e. the county code and the network destination code) and the third portion 26 are used to identify an address of a particular home location register (HLR). However, it will be appreciated that, in some instances, the address of a particular home location register may include additional bits contained somewhere within an enlarged version of a MSISDN 20, or may be identified simply through the CC and NDC. It will further be appreciated by a person of ordinary skill in the art that a single HLR may be identified by the combination of a country code and more than one network destination code.

Upon receiving MSISDN 20, Gateway MSC 18 intelligently routes the MSISDN 20 (which precedes a call) to a particular HLR based upon the identification of the country code 22 and NDC 24. Typically, the routing of MSISDN 20 to a HLR is achieved via a STP (Signalling Transfer Point) 28. This STP 28 may be excluded from the architecture of the preferred embodiment of the present invention, but is usually included to enhance and improve the routing of calls in the cellular communication system 10, as will be understood. For the sake of simplicity of explanation, only two HLRs are illustrated in FIG. 1, with $HLR_1$ and $HLR_2$ both coupled to STP 28 thorough a Mobile Application Part (MAP) connection (31 and 32). Similarly a map connection 33 exists between STP 28 and Gateway MSC 18.

Referring specifically to $HLR_1$, it can be seen that this HLR contains a fixed (dedicated) range of MSISDNs ranging from 100 to 119. Also, $HLR_1$ contains a fixed (dedicated) range of IMSIs ranging from 1000 to 1019. In this drawing figure, an arrow from a MSISDN address, such as address 102, to an IMSI address represents the mapping of that particular MSISDN to that particular IMSI (and illustrates the assignment of a subscriber unit or SIM card to a particular IMSI belonging to the network operator). In a similar manner, $HLR_2$ has a range of MSISDNs ranging from 120 to 139 and a range of IMSIs ranging from 1020 to 1039. As can be seen from a comparison of $HLR_1$ with $HLR_2$, no two HLRs have overlapping ranges of either MSISDNs or IMSIs. Furthermore, in the case of $HLR_2$, it can be seen that MSISDN addresses 120 and 122 are mapped to a solitary IMSI (address 1020). This many-to-one mapping illustrates that two cellular telephones, for example, are associated with a single IMSI, whereby a single account can be utilised by the network operator to provide billing, for example, to one client having a number of cellular phones.

Additionally, multiple MSISDNs (for different telecommunication services, such as fax and data) can be attributed to a single IMSI. It will of course be appreciated that, in the context of the present invention, the term "cellular telephone" is generic and includes other forms of communication device, such as portable microcomputers, data telephones and radio pagers.

Gateway MSC 18 is further coupled through a communication link 36 (a map communication link) to a Visiting Mobile Switching Centre (VMSC) 38. The VMSC 38 contains a visiting location register (VLR) 40 that stores subscriber data down-loaded from a HLR located in another geographic service area. VMSC 38 is located in Away Area 14. The subscriber data stored in VLR 40 allows local area control of a visiting subscriber unit that has roamed away from its home area (e.g. Home Area 12) into the away area of the VMSC 38.

A base transceiver station (BTS) 42 is coupled through a Base Site Controller (BSC) 44 to the VMSC 38. As will be appreciated, the BTS 42 communicates with a mobile subscriber unit 46 (which may be a roaming subscriber unit) over a communication link 48, such as a radio frequency communication link.

In operation, the prior art communication system 10 of FIG. 1 receives an instruction (in the form of MSISDN 20) to set up a mobile terminated call with a roaming subscriber unit 46. In response to the MSISDN 20, the home location register of roaming subscriber unit 46 is identified by Gateway MSC 18. Interrogation of the home location register of roaming subscriber unit 46 reveals a particular IMSI (for example IMSI 102 of $HLR_1$) in which subscription and other information pertaining to roaming subscriber unit 46 is contained.

As will be appreciated, the current location of roaming subscriber unit 46 (amongst other things) is stored within the IMSI record at the HLR of roaming subscriber unit 46. The location information identifies VMSC 38 of Away Area 14 as being currently responsible for operational control of roaming subscriber unit 46. Gateway MSC 18 is responsible for establishing a C-7 signalling link between the home location register of the roaming subscriber unit 46 (in this case $HLR_1$) and VMSC 38. IMSI data pertaining to roaming subscriber unit 46 is then communicated over the C-7 signalling link to be stored in VLR 40. In response to this information, VLR 40 assigns a mobile subscriber roaming number (MSRN) to the roaming subscriber unit 46, and then sends back the MSRN to the home location register of roaming subscriber unit 46. Subsequently, the assigned MSRN is sent to Gateway MSC 18 and is used by Gateway MSC 18 to establish a direct link between external network 16 (that wishes to communicate with roaming subscriber unit 46) and VMSC 38.

FIG. 2 shows an exemplary structure of a prior art memory location for an IMSI. The IMSI contains a number of information bearing segments, including segments dedicated to recording a present Mobile Country Code (MCC) and a mobile network code (MNC). These information bearing segments are used to identify the current location of a roaming subscriber unit, such as unit 46, and other subscription information (as will readily be appreciated by a person of ordinary skill in the art.) Furthermore, as will be understood, subscription data in an IMSI is periodically updated by the communication system during location updates, for example.

As has been explained, large networks cannot interlink in terms of extending the ranges of MSISDNs and IMSIs associated with a particular HLR because both number ranges of the MSISDNs and IMSIs are dedicated (to a particular HLR) and therefore constrained to reside in the same HLR. The preferred embodiments of the present invention provide an ability to separate IMSIs and MSISDNs between HLR platforms either by (i) utilising a home location register router positioned between the Gateway MSC 18 and the plurality of home location registers serviced by the Gateway MSC. This structural configuration is illustrated in FIG. 3, in which a HLR router 64 is coupled to a plurality of HLRs ($HLR_2$, $HLR_3$ and $HLR_N$) and, via the optional STP 28, to Gateway MSC 18, or (ii) by decoupling subscriber information (data) within a HLR by internally partitioning IMSI-keyed data from MSISDN-keyed data while providing an IMSI-MSISDN cross-reference between these two partitioned storage areas, thereby allowing cross-network access to similarly partitioned HLRs. However, in both embodiments, IMSI ranges and MSISDN ranges (and the data pertaining thereto) are separated into dedicated (indexed) databases respectively containing multitudes of IMSIs and multitudes of MSISDNs, with some form of cross-referencing provided between the IMSI and MSISDN indexed databases to maintain any relationship between a particular MSISDN and a particular IMSI.

Figure 4:
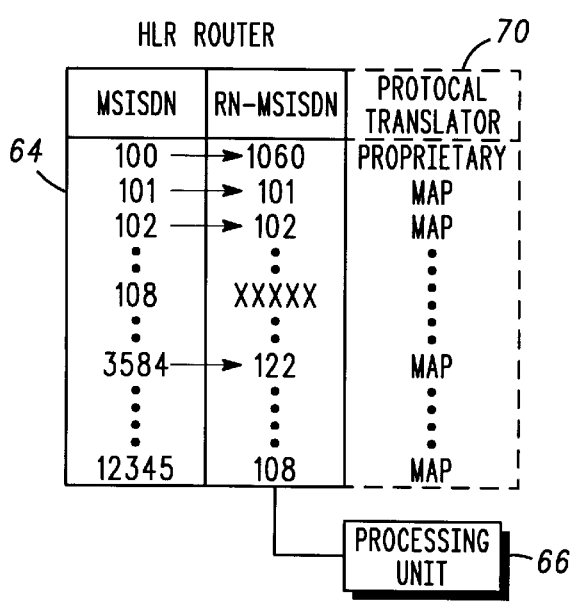
FIG. 4 shows a preferred embodiment of a HLR router used in the communication system of FIG. 3.

Now, referring to FIG. 4, HLR router 64 is shown in greater detail. To provide the flexibility of allowing a user to retain a current MSISDN, or to request a particular (special) MSISDN or to conserve IMSIs by allowing a mapping of a new MSISDN to an IMSI located in a different HLR, the HLR router 64 operates to map a MSISDN to a routing number MSISDN (RN-MSISDN). The HLR router 64, which is invisible to a subscriber of the network, is therefore a large database that contains MSISDNs associated with RN-MSISDNs for substantial portions of the entire communication system. Consequently, in the new system architecture (shown in FIG. 3), HLRs are re-configured to have a range of RN-MSISDN addresses (rather than a range of MSISDNs), with each address associated with a particular IMSI from a range of IMSIs in a particular HLR. For example, $HLR_N$ contains RN-MSISDN addresses 1060 to 1079 and IMSI addresses 2060 to 2079, with one or more of the range of RN-MSISDN addresses capable of being mapped onto a single IMSI. As such, when a mobile terminated call originated from external network 16 is directed to HLR router 64 by Gateway MSC 18, the MSISDN identified in the call from the external network 16 is mapped onto the RN-MSISDN which then re-directs (maps) the MSISDN (in the form of an intermediate address, i.e. the RN-MSISDN) to the correct HLR and hence the correct IMSI. As will be appreciated, the HLR router 64 is operationally responsive to a processing unit 66, which intelligently routes the intermediate address to the correct HLR. This processing unit may be located at the HLR router 64, or elsewhere within the communication system, such as at Gateway MSC 18.

The function of the present invention may, alternatively, be considered as separating assignable MSISDNs from IMSIs by providing a HLR router. Mapping of at least one MSISDN to a single IMSI across HLR platforms (having fixed address ranges) is then accomplished by providing an intermediate address (i.e. the RN-MSISDN) common to both the HLR router and a HLR, whereby a directory number assigned to a subscriber (as an electronic code in a cellular phone or as a SIM card in the case of the GSM communication system) is converted to a RN-MSISDN in the HLR router, whereafter the RN-MSISDN is intelligently networked to the HLR containing that RN-MSISDN. Therefore, since the RN-MSISDN in the HLR is also associated (mapped) with a dedicated IMSI, the information in the IMSI relating to the originally dialed directory number (MSISDN) is obtained by the communication system and forwarded accordingly.

The operation of the interface provided by HLR router 64 can be better understood with reference to the following examples in collaboration with FIG. 4.

In a first example, it is assumed that a roaming subscriber unit (such as mobile 46) is content with its assigned directory number (MSISDN) "102". Therefore, to map this directory number to the correct IMSI in the correct HLR, an identical RN-MSISDN is associated with that directory number, whereby an incoming call directed to directory number (MSISDN) "102" is routed (through a MAP protocol and via the RN-MSISDN) to $HLR_3$ (which contains the specified RN-MSISDN range). The RN-MSISDN in $HLR_3$ is directly associated with IMSI address "1002".

In a second example, a subscriber has lost their assigned SIM card on which the originally assigned IMSI was recorded. In this instance, the original directory number assigned to the subscriber was "100". Since the subscriber wishes to retain this original directory number (whilst maintaining security of IMSI information stored in the subscriber's home location register), RN-MSISDN "1060" is associated with this original directory number in HLR router 64. Consequently, a call directed towards directory number "100" will be re-routed to $HLR_N$ and hence to new IMSI "2060". It is noted that the original IMSI associated with MSISDN "100" (that corresponds to original RN-MSISDN "100" in $HLR_3$) is disregarded and now contains no meaningful information pertaining to original directory number "100", as identified by "XXXXXX". Once an IMSI has been disregarded, the network operator may purge the information contained in that IMSI at its convenience.

In a third instance, the network operator decides to assign a new directory number "3584" to an IMSI "1020" (on another HLR platform) that is either unused or has been previously disregarded. As such, HLR router 64 maps new directory number "3584" to RN-MSISDN "122", which routing number MSISDN directs the call to $HLR_2$ and hence IMSI "1020".

Finally, a subscriber may wish to be assigned a special directory number, such as "12345", rather than to maintain an originally assigned directory number, such as "108". Since the network operator may be unwilling to re-assign a new IMSI in another HLR, or this special directory number may be out-of-range, HLR router 64 associates (maps) this special directory number with RN-MSISDN "108" (associated previously with originally assigned MSISDN "108"). Therefore, when special directory number "12345" is subsequently called, HLR router 64 routes the call to IMSI "1008" in $HLR_3$.

In a preferred embodiment, the HLR router 64 may also include a protocol translator 70 associated with each RN-MSISDN. The function of this protocol translator 70 is to translate, for example, a MAP protocol into a proprietary protocol which is subsequently used as the communication link to the HLR. This can be seen in FIGS. 3 and 4. More particularly, a MAP protocol may exist between Gateway MSC 18 and HLR router 60, but a proprietary protocol may be utilised between HLR router 60 and one or more of the HLRs, e.g. $HLR_N$. As such, the protocol translator 70 enables interconnection of a proprietary network to an existing cellular communication system by providing the necessary "soft" interface required for the routing of a call.

Figure 5:
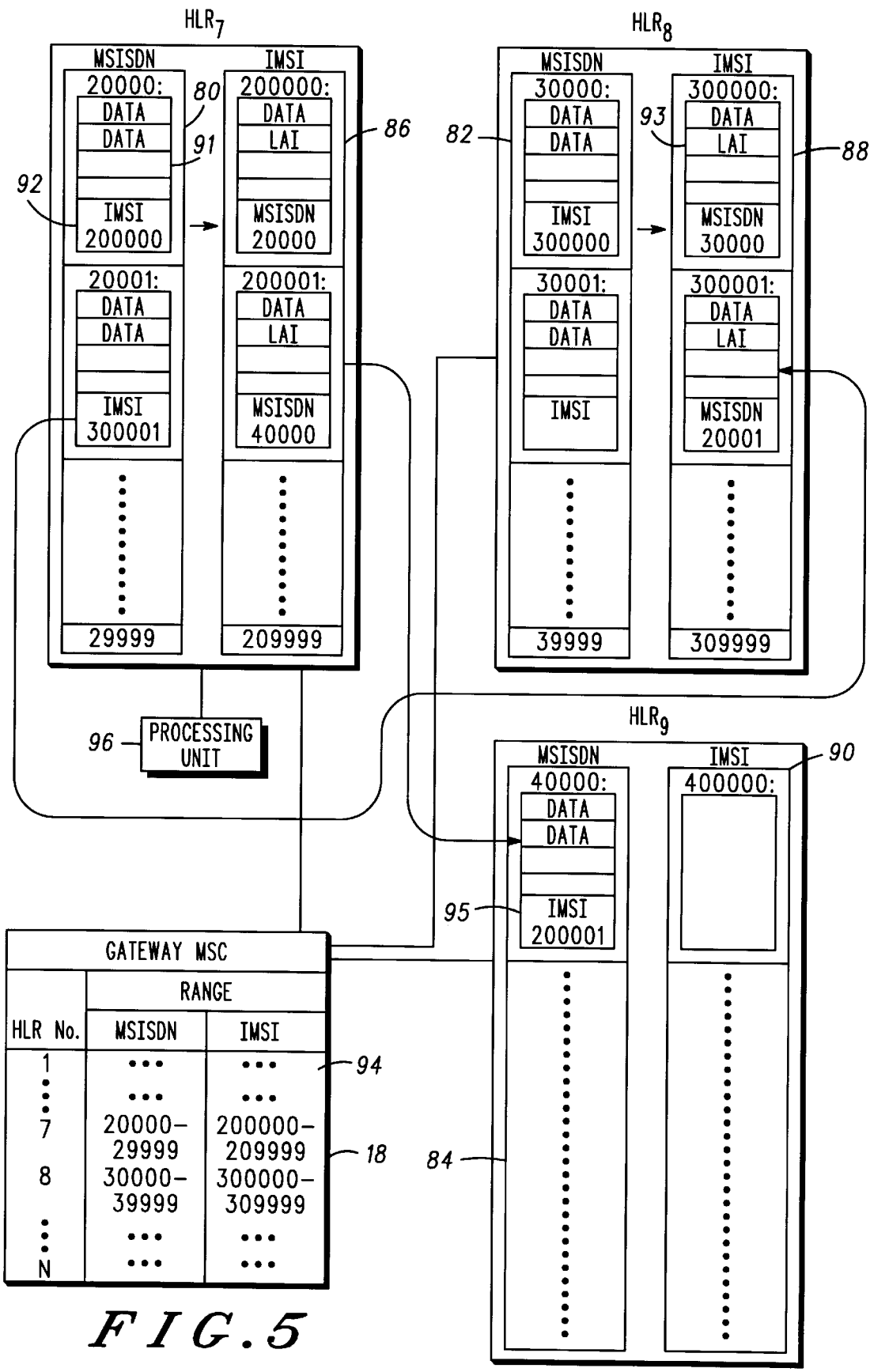
FIG. 5 illustrates partitioning of subscriber information within a HLR, according to a second embodiment of the present invention.

FIG. 5 illustrates partitioning of subscriber information within HLRs (which provides database decoupling), according to a second embodiment of the present invention. As shown in FIG. 5, three HLRs are coupled together so that a communication between HLRs can take place. In it's most generic sense, however, the communication system in accordance with the invention need only comprise a switch (having a relationship between directory numbers (MSISDNs) and HLRs—such as the Gateway MSC 94), a first HLR (coupled to the switch and having a range of directory numbers (MSISDNs), for establishing the call with the external network if the directory number (MSISDN) identified in the call is in the range of directory numbers (MSISDNs) associated with the first HLR—such as the $HLR_7$) and a second HLR (coupled to both the first HLR and the external network, for accepting information from the first HLR to establish the call to the subscriber unit when the call is not established by the first HLR—such as the $HLR_8$ or the $HLR_9$).

Although only three HLRs ($HLR_7$, $HLR_8$ and $HLR_9$) have been illustrated for the sake of brevity, the memory of each HLR has been partitioned into two discrete databases: one for MSISDN-keyed data (80, 82, 84) and a second for IMSI-keyed data (86, 88, 90). Furthermore, each HLR is coupled (typically through a MAP interface) to Gateway MSC 18, which Gateway MSC 18 contains a routing table 94 that relates HLRs with particular ranges of MSISDNs and IMSIs. For example, routing table 94 identifies $HLR_7$ as containing a range of MSISDN addresses between "20000" and "29999" and a range of IMSI addresses between "200000" and "209999".

Data relevant to a MSISDN address, such as MSISDN address "20000", is stored in a corresponding memory block 91 reserved for this MSISDN address. Memory block 91 typically contains several data fields, including a dedicated IMSI-field 92 for a related IMSI address (in this specific instance IMSI address "200000") and data representing a distinct basic service related to a particular MSISDN. In a similar fashion, Data relevant to an IMSI address, such as IMSI address "300000", is stored in a corresponding memory block 93 reserved for this IMSI address. Memory block 93 typically contains several data fields, including a dedicated MSISDN-field 94 for a related MSISDN address (in this specific instance MSISDN address "30000") and, perhaps, a field dedicated for storage of a Local Area Identifier (LAI). As such, each memory block (e.g. 91) in each MSISDN-keyed database in each HLR can provide a cross-reference to another memory block (e.g. 93) in each IMSI-keyed database in each HLR (even if the databases are geographically (physically) separated between HLR platforms of a communication system). As will be appreciated, each database (80–90) in each HLR can contain many thousands of memory blocks (and hence many thousands of MSISDN and IMSI addresses).

Whenever a HLR is required to retrieve (and forward) or store information relating to an identified subscription (through the reception of either an IMSI address or a MSISDN address), the HLR searches for a corresponding record on the relevant IMSI-keyed database or MSISDN-keyed database, i.e. the type of search proceeds on the basis of whether an IMSI address or MSISDN address was received and therefore on whatever function was invoked. Therefore, the HLR can either provide information required to perform a function directly from the database first searched, or can access the required information (that therefore resides in another database) by accordingly routing the request through the use of the IMSI-MSISDN cross-reference already stored in the first accessed database.

Thus, for an incoming call, a HLR receives a routing inquiry (from Gateway MSC 18) containing the MSISDN of the called party. The HLR then accesses the subscriber data in the MSISDN-keyed database in an attempt to determine the location of the called party. Since location information (in the form of a LAI) is stored against the IMSI of the called party, the HLR takes the IMSI of the called party from the MSISDN-keyed database and accesses the IMSI-keyed database to find the location. The HLR may then contact the serving MSC of the called party to complete the routing inquiry on behalf of the Gateway MSC.

According to the second embodiment of the present invention, the handling of out-of-range numbers during inbound call routing, generally, is facilitated in the following manner. Where an out-of-range MSISDN has been assigned to a subscriber, the IMSI-keyed database resides on one HLR (the second or "secondary" HLR) and the MSISDN-keyed database is placed in the HLR that owns that particular MSISDN number range (the first or "primary" HLR). Since a routing inquiry from a Gateway MSC is based on the MSISDN, the primary HLR is contacted. Then, the primary HLR finds the location of the called party (which is stored in the IMSI-keyed database on the secondary HLR) by translating the MSISDN into the corresponding IMSI. The translation is performed by the processing unit 96 coupled to the primary HLR ($HLR_7$ as shown in FIG. 5). Thereafter, the primary HLR forwards a Forward Send Routing Information signal to the secondary HLR, which signal contains the IMSI of the called party and the corresponding data representing the associated basic service. As will be appreciated, the primary HLR is able to forward the Forward Send Routing Information signal to the correct HLR because the IMSI of the called party is in the unique and defined range for that HLR. The secondary HLR accesses the IMSI-keyed database to find the called parties location (stored in the LAI) and then contacts the serving MSC to obtain the necessary routing information. Subsequently, this routing information is passed from the secondary HLR to the Gateway MSC to route (and thus establish) the incoming call.

It should be noted that the handling of out-of-range numbers for short message service (SMS) delivery is similar to that described above, except that the information forwarded from the primary HLR to the secondary HLR does not include the data representing the associated basic service.

Operation of the second embodiment of the present invention can be better understood by considering the following three examples:

1) A subscriber is content with their MSISDN allocation (e.g. address "20000". Therefore, the HLR internally jumps between the MSISDN-keyed database and IMSI-keyed database (since both MSISDN "20000" and IMSI "200000" are probably located on a common HLR).

2) A subscriber has lost the assigned SIM card and does not want to change from directory number (MSISDN) "20001". A new SIM and hence a new IMSI ("300001") on a new HLR ($HLR_8$ rather than $HLR_7$) is assigned to the subscriber. Subscription data is entered in IMSI-keyed database 88 of new $HLR_8$ (which HLR becomes the primary HLR). The MSISDN record "20001" of MSISDN-keyed database 80 of $HLR_7$ is amended (which HLR becomes the secondary HLR) to include a cross-reference 92 to new IMSI "300001". The handling of calls then operates as described above.

3) A subscriber asks for a directory number (MSISDN) "40000" that it out-of-range of $HLR_7$. The data in IMSI address "200001" (previously associated with the originally assigned MSISDN) of IMSI-keyed database 86 remains in $HLR_7$ (which HLR becomes the primary HLR). A subscriber record (including a cross-reference 95) is created in MSISDN-keyed database 84 of $HLR_9$, since $HLR_9$ contains the desired directory number (MSISDN) "40000" in its MSISDN number range (whereafter $HLR_9$ becomes the secondary HLR). The handling of calls then operates as described above.

Consequently, the interface arrangement of the present invention allows a network operator greater flexibility in system management by providing a mechanism for separating MSISDNs and IMSIs between HLR platforms. As such, the network operator is able to continue to use IMSIs associated with lost SIM cards (without affecting security of that IMSI), and to continue to use an IMSI which would otherwise be out-of-range for a special directory number requested by a subscriber. In the former respect, a subscriber is therefore able to retain a current directory number. In the first embodiment of the present invention, a network operator need only alter (change) the mapping between the MSISDN and the RN-MSISDN in the HLR router to change a directory number (for whatever reason). Furthermore, any relationship (such as a geographic relationship) between RN-MSISDNs and IMSIs in a particular HLR can be maintained by the use of the HLR router. Therefore, there is no distribution of subscriber information in the system, which may be beneficial to the network operator in terms of communication system maintenance and control. In the second embodiment of the present invention, a network operator need only alter the IMSI-MSISDN cross-reference between the distinct, partitioned (and potentially physically separate) IMSI and MSISDN storage areas in the HLR(s).

It will, of course, be understood that the above description has been given by way of example only, and that modifications in detail may be made within the scope of the invention. For example, although the communication system has been described in the context of multiple HLRs, it will be appreciated that a communication system having a single HLR may still suffer from an out-of-range problem if a subscriber requests a special directory number that is outside a network operator's allocated range. Therefore, a RN-MSISDN in a routing HLR could still be utilised to provide access to an IMSI in the single HLR belonging to the network operator. Additionally, it will be appreciated that, in a similar manner to the many-to-one mappings of RN-MSISDNs to IMSIs, more than one MSISDN may be mapped to a single RN-MSISDN. It will be further appreciated that the foregoing description should not be construed solely in the context of voice calls, but that it may equally well be applied to other forms of communication routing, such as SMS messaging.

What we claim is:

1. A communication system having a range of Mobile Subscriber Integrated Service Digital Network (MSISDN) addresses and a range of International Mobile Subscriber Identities (IMSIs) assigned thereto for storing subscription information, the communication system comprising at least two distinct databases having a different format and content and separated from one another and indexed in terms of said ranges of MSISDN addresses and said ranges of IMSIs, wherein a cross-reference is both stored within a particular MSISDN and a particular IMSI to maintain an association therebetween, thereby allowing access to subscription information stored in at least one of the particular MSISDN and the particular IMSI.

2. The communication system of claim 1, further comprising a plurality of home location registers each having a unique range of the MSISDN addresses and IMSI addresses assigned thereto, each home location register of the plurality of home location registers comprising memory partitioned into a MSISDN-keyed database and an IMSI-keyed database, the MSISDN-keyed database and the IMSI-keyed database each comprising memory blocks, for storing the subscription information, identified by one of a MSISDN address and an IMSI address assigned respectively thereto, wherein a MSISDN address of a first home location register of the plurality of home location registers is associated with an IMSI address of a second home location register of the plurality of home location registers and each memory block of each database contains the cross-reference for the association, thereby allowing cross-system access to similarly partitioned home location registers.

3. A communication system of claim 1, for routing a call from an external network to a subscriber unit having a directory number identified in the call, the directory number representing an MSISDN, the communication system comprising:

a HLR router, coupled to the external communication network, having a range of directory numbers and a range of intermediate addresses, wherein at least some of the directory numbers of the range of directory numbers are mapped to one intermediate address (RN-MSISDN) to convert a received directory number to an intermediate address;

a plurality of home location registers ($HLR_2$, $HLR_3$ $HLR_N$), each coupled to the HLR router and each having a range of intermediate addresses and a range of IMSIs, wherein each IMSI is arranged to store information pertaining to a subscriber unit and no two HLRs have the same ranges of intermediate addresses and IMSIs; and a processing unit for controlling the routing of the intermediate address to a home location register in which the intermediate address resides, such that information relevant to the directory number that originated from the external network is recovered from a mapping, in the HLR, of the intermediate address with an IMSI associated therewith;

whereby the communication system allows separation, across a plurality of HLRs, of a MSISDN from an IMSI of a subscriber unit that is related to the MSISDN.

4. The communication system of claim 3, wherein the HLR router further comprises protocol translators associated with each intermediate address, wherein the protocol translators are arranged to provide a signalling scheme suitable for interconnection of the routing terminal to each HLR.

5. The communication system of claim 3, wherein the communication system is a cellular communication system.

6. A routing terminal, arranged to receive a Mobile Subscriber Integrated Service Digital Networks (MSISDN) including a directory number originating from an external network, for routing a call to a subscriber unit having that directory number, the routing terminal arranged to be coupled to at least one home location register (HLR) of a communication system, the routing terminal comprising:

a range of directory numbers (MSISDNs) and a range of intermediate addresses (RN-MSISDNs), each intermediate address (RN-MSISDN) associated with at least one directory number to convert a received directory number to an intermediate address;

wherein the routing terminal is responsive to a processing unit that directs the intermediate address to a HLR having that intermediate address contained within a range of intermediate addresses, the HLR further comprising a range of International Mobile Subscriber Identities (IMSIs) for storing information, wherein each IMSI in the range of IMSIs is responsive to at least one intermediate address of the range of intermediate addresses such that information relevant to the directory number that originated from the external network is recovered from a mapping of the intermediate address with an IMSI associated therewith.

7. The routing terminal of claim 6, further comprising protocol translators associated with each intermediate address, wherein the protocol translators are arranged to provide a signalling scheme suitable for interconnection of the routing terminal to the at least one HLR.

8. A home location register for a cellular communication system having a range of Mobile Subscriber Integrated Service Digital Networks (MSISDNs) and a range of International Mobile Subscriber Identities (IMSIs) assigned thereto, the home location register comprising at least two databases separated from one another and indexed in terms of a specific proportion of the range of MSISDNs and a specific proportion of the range of IMSIs, wherein a cross-reference is both stored within a particular MSISDN and a particular IMSI to maintain an association therebetween and such that the cross-reference may identify one of the particular MSISDN and the particular IMSI as falling outside the proportion of the range of each respective database, thereby allowing access to subscription information stored in at least one of the particular MSISDN and the particular IMSI.

9. A communication system for establishing a call from an external network to a subscriber unit having a Mobile Subscriber Integrated Service Digital Network (MSISDN) address including a directory number identified in the call, the communication system comprising:

a primary HLR coupled to the external communication network, the primary HLR having a range of directory numbers and a range of international mobile station identification (IMSI) numbers;

a secondary HLR, distinct from the primary HLR and arranged in a different format and to include different content than the primary HLR and coupled to the primary HLR and the external network, the secondary HLR having a range of IMSIs, the range of IMSIs including the IMSI identified in the call, wherein each IMSI is arranged to store information pertaining to a subscriber unit; and a processing unit, coupled to the primary HLR, for controlling routing of the IMSI identified in the call to the secondary HLR such that the secondary HLR establishes the call to the subscriber unit.

10. The communication system of claim 9, wherein each directory number representing an MSISDN has associated therewith data representing a distinct basic service.

11. The communication system of claim 9, wherein the primary HLR is one of a plurality of HLRs.

12. The communication system of claim 11, wherein each of the plurality of HLRs has a different directory number representing an MSISDN associated therewith.

13. The communication system of claim 9, wherein the secondary HLR is one of a plurality of HLRs.

14. The communication system of claim 13, wherein no two of the plurality of HLRs have the same ranges of IMSIs.

15. The communication system of claim 9, wherein the communication system is compatible with the Groupe Speciale Mobile (GSM) communication system.

16. A method of establishing a call from an external network to a subscriber unit of a communication system coupled to the external network, the subscriber unit having a Mobile Subscriber Integrated Service Digital Networks (MSISDN) including a directory number identified in the call, the method comprising the steps of:

receiving, in a first home location register (HLR), the directory number from the external network;

translating the directory number to an international mobile station identification (IMSI) number associated with the directory number;

intelligently forwarding the IMSI to a second HLR, coupled to the first HLR, containing the IMSI identified in the call; and establishing the call from the external network to the subscriber unit via the second HLR based on the IMSI identified in the call.

17. The method of claim 16, wherein the step of translating is performed in a processing unit coupled to the first HLR.

18. A communication system for establishing a call from an external network to a subscriber unit of a cellular communication system coupled to the external network, the subscriber unit having a Mobile Subscriber Integrated Service Digital Networks (MSISDN) including a directory number identified in the call, the communication system comprising:

a switch, having a relationship between directory numbers (MSISDNs) and home location registers (HLRs), for routing the call to a particular HLR;

a first HLR, coupled to the switch and having a range of directory numbers (MSISDNs), for establishing the call with the external network if the directory number (MSISDN) identified in the call is in the range of directory numbers (MSISDNs) associated with the first HLR; and a second HLR, coupled to both the first HLR and the external network, for accepting information from the first HLR to establish the call to the subscriber unit when the call is not established by the first HLR.

19. The communication system of claim 18, wherein information from the first HLR further comprises an international mobile station identification (IMSI) number associated with the directory number (MSISDN) identified in the call.

20. The communication system of claim 18, wherein information from the first HLR further comprises data representing a distinct basic service associated with the directory number (MSISDN) identified in the call.

* * * * *